Patented July 31, 1928.

1,679,250

UNITED STATES PATENT OFFICE.

OTTO LIND, OF DUSSELDORF, GERMANY.

UREASE PREPARATION.

No Drawing. Application filed September 3, 1927, Serial No. 217,527, and in Germany September 15, 1926.

This invention relates to a method for making stable, easily soluble, light-colored and dry urease preparations from aqueous extracts of soya beans, jack beans or similar parts of urease-containing vegetables.

The preparation of urease, an enzyme decomposing urea, by extracting vegetables such as soya beans or jack beans with water is known. But extracts are not stable and decompose in a short time; the albuminous substances precipitate and thus carry down the enzyme, thus weakening or even annulling the effectiveness of the extract in decomposing urea. It is not possible to stabilize aqueous extracts of the above mentioned kind by addition of salts, such as di-sodium-phosphate. If aqueous extracts of plants containing urease are evaporated at low temperatures eventually at reduced pressure a dark-colored, horny mass is obtained, which is soluble in water. Furthermore by this evaporation a part of the urease is decomposed. But when the aqueous extract is precipitated with alcohol or acetone and the precipitate is dried in known manner, a light-colored product is obtained, which is insoluble in water when it has been precipitated by alcohol and is soluble in water when it has been precipitated by acetone. By this precipitation however a great part of the urease is destroyed by the substances used for precipitating it and the products obtained therefore have varying degrees of effectiveness.

The present invention relates to a method for making a stable urease preparation not having the above mentioned disadvantages. According to the invention an aqueous, filtered and centrifugalized extract of soya beans, jack beans or similar parts of plants containing urease is freed from water, by atomizing such extract into a steam of dry and heated air or gases. Although urease in aqueous solutions is decomposed at temperatures between 70° and 80° C., according to the invention temperatures for above 100° C. may be used, without injuring the enzyme.

The product obtained according to the invention is of light color and easily soluble in water. It contains all the urease originally present and remains constantly effective.

Certain chemicals, such as di-sodium-phosphate, mono-potassium-phosphate or mixtures of these substances, may be added to the aqueous extract of the urease or the plants may be extracted with solutions of these salts. The dry products obtained by atomization of these extracts into streams of heated air or gases are then more homogeneous and easier soluble in water. Whereas the urease particles themselves first swell in water and are dissolved comparatively slowly therein, products containing urease and the above mentioned salts and obtained by atomization of extracts containing these salts are quickly and easily dissolved in water.

Among the uses to which the product may be put are for the analytical determination of urea, since urease will quantitatively decompose urea to ammonia, and as an addition to washing and detergent preparations whereby such preparations are made effective to remove dirt from fire materials without scrubbing or other rough treatment.

I claim:

1. A method for making stable, easily soluble, light-colored, dry urease preparations which consists in extracting urease-containing vegetables with water, adding water soluble phosphates to the aqueous extract and atomizing such extract into a dry and heated gas stream to free it from water.

2. A method for making stable, easily soluble, light-colored, dry urease preparations which consists in extracting urease-containing vegetables with water, adding alkali-metal phosphates to the aqueous extract and atomizing such extract into a dry and heated gas stream to free it from water.

3. A method for making stable, easily soluble, light-colored, dry urease preparations which consists in extracting urease-containing vegetables with aqueous solutions of phosphates and atomizing the resulting extract into a dry and heated gas stream to free it from water.

4. A method for making stable, easily soluble, light-colored, dry urease preparations which consists in extracting urease-containing vegetables with aqueous solutions of alkali-metal phosphates and atomizing the resulting extract into a dry and heated gas stream to free it from water.

In testimony whereof I affix my signature.

OTTO LIND.